Aug. 11, 1953 W. H. COLGATE 2,648,156
DUAL CONTAINER WITH VIEWING WINDOW
Filed July 30, 1947 8 Sheets-Sheet 1
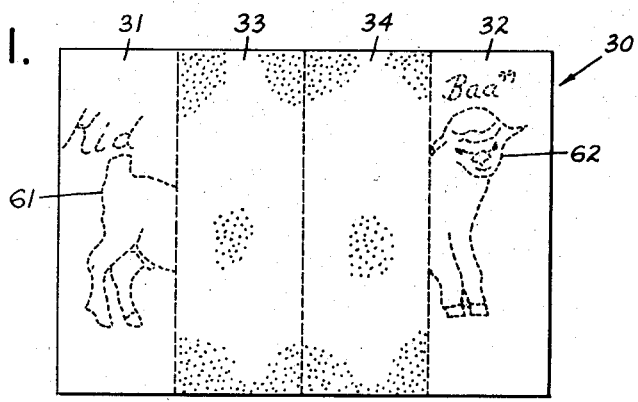
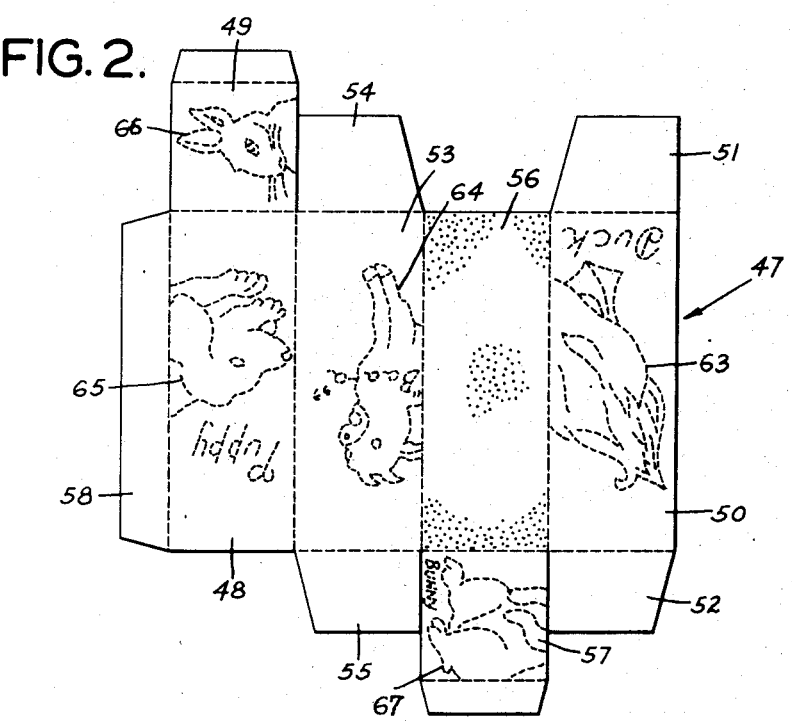
INVENTOR.
WILLIAM HOMER COLGATE
BY
HIS ATTORNEYS.

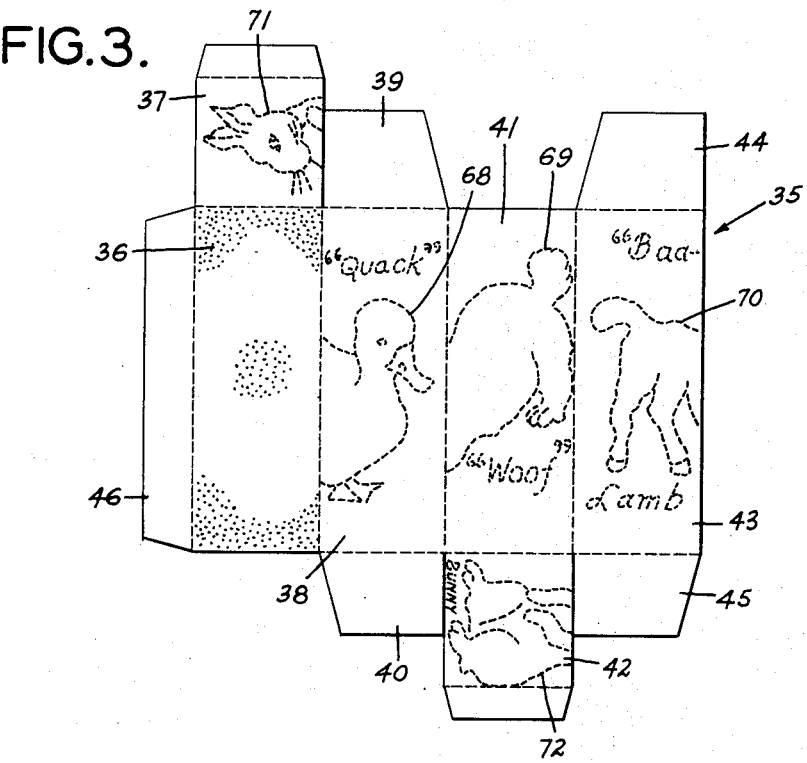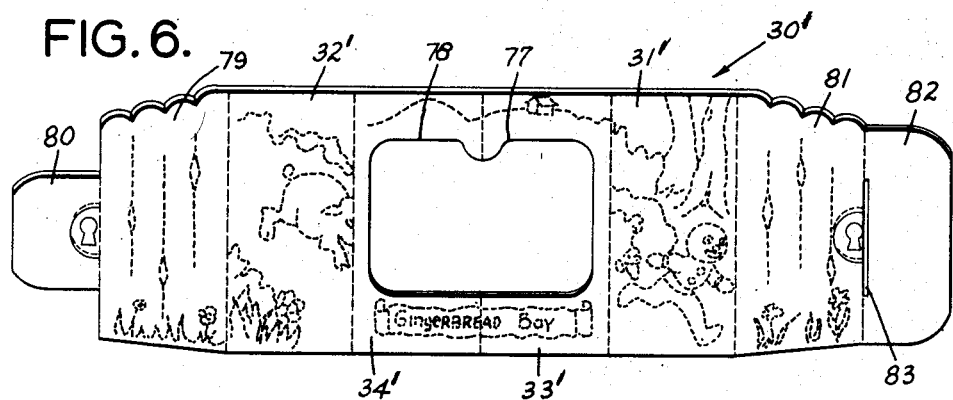

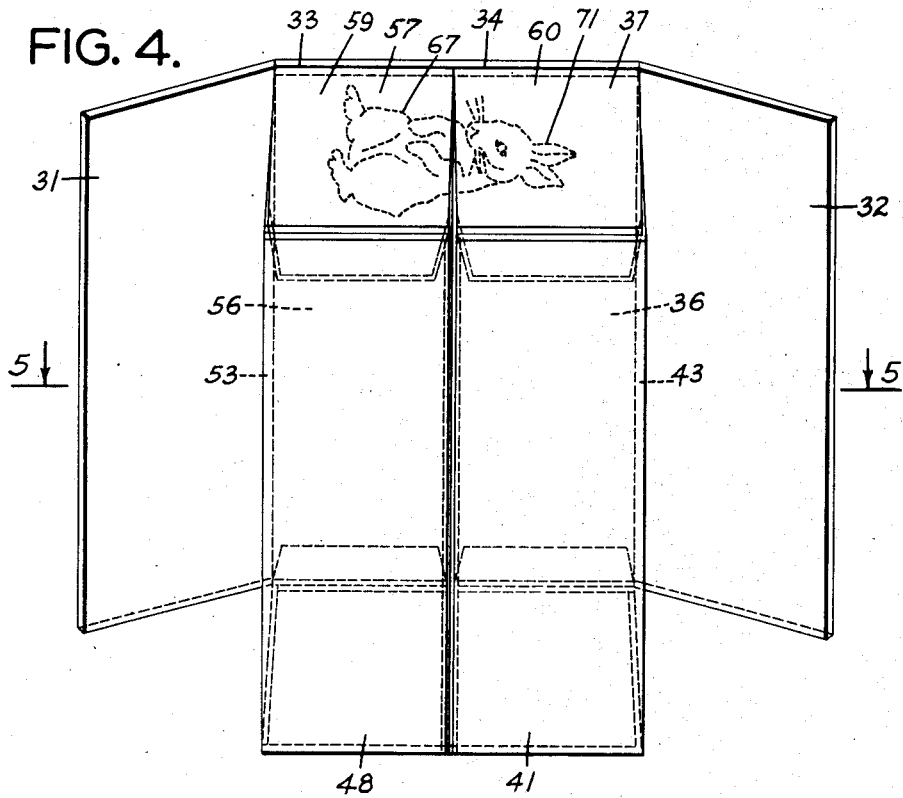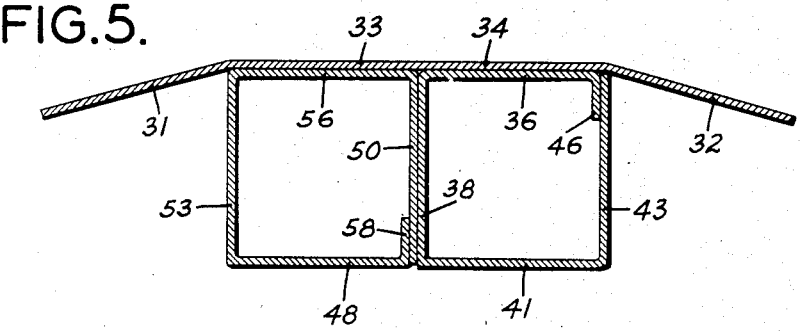

Aug. 11, 1953 W. H. COLGATE 2,648,156
DUAL CONTAINER WITH VIEWING WINDOW
Filed July 30, 1947 8 Sheets-Sheet 4

INVENTOR.
WILLIAM HOMER COLGATE
BY
Campbell, Brumbaugh & Free
HIS ATTORNEYS.

Aug. 11, 1953 W. H. COLGATE 2,648,156
DUAL CONTAINER WITH VIEWING WINDOW
Filed July 30, 1947 8 Sheets-Sheet 5
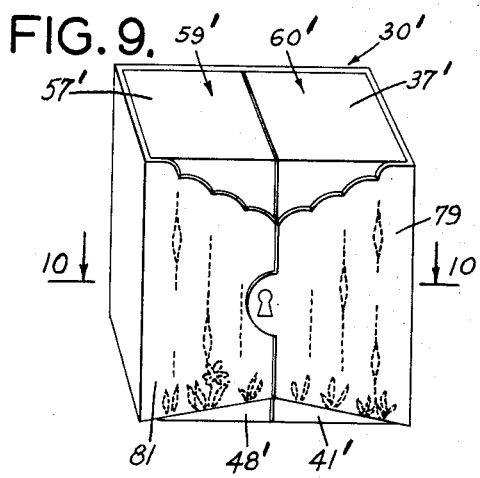
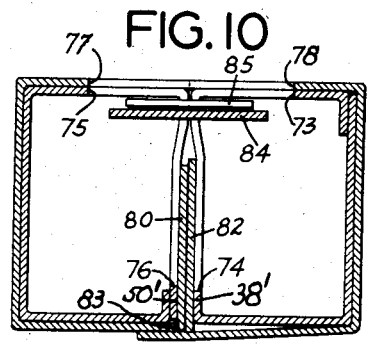
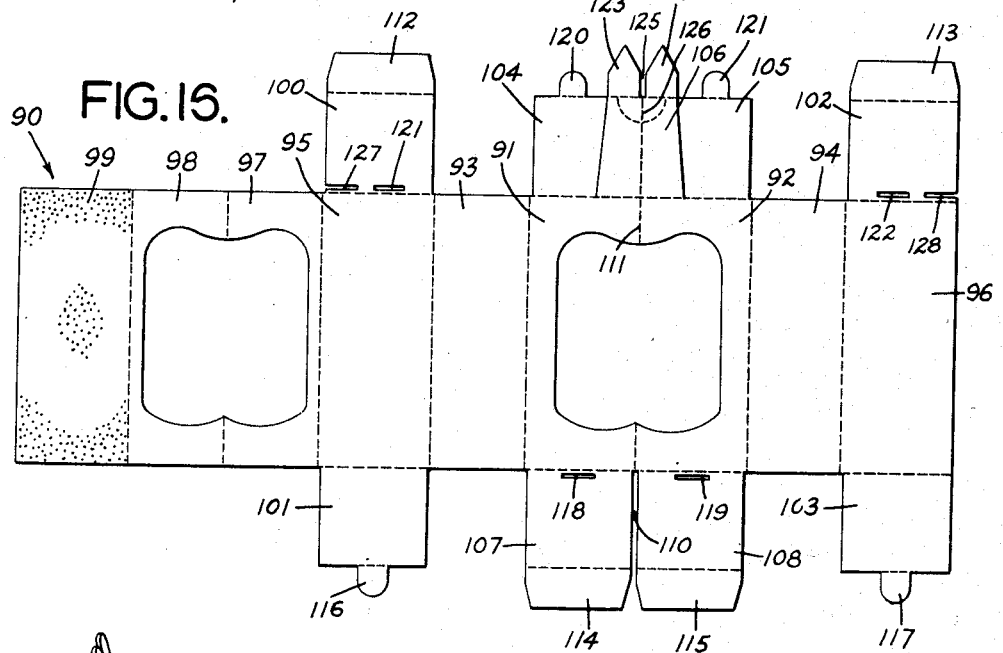
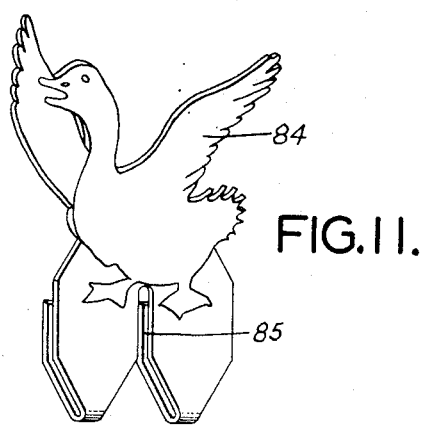
*INVENTOR.*
WILLIAM HOMER COLGATE
BY
Campbell, Brumbaugh & Free
*HIS ATTORNEYS.*

Aug. 11, 1953 W. H. COLGATE 2,648,156
DUAL CONTAINER WITH VIEWING WINDOW
Filed July 30, 1947 8 Sheets-Sheet 6
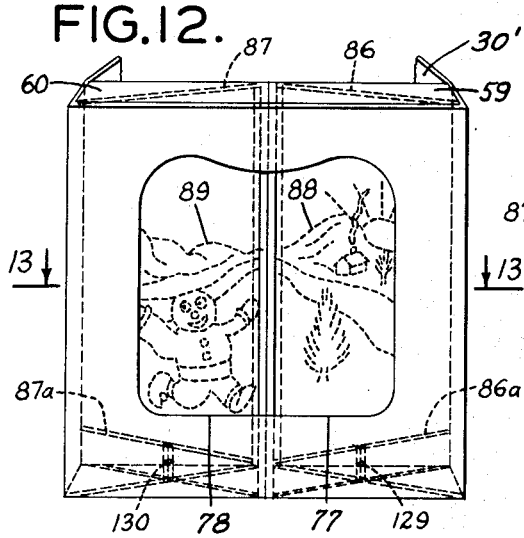
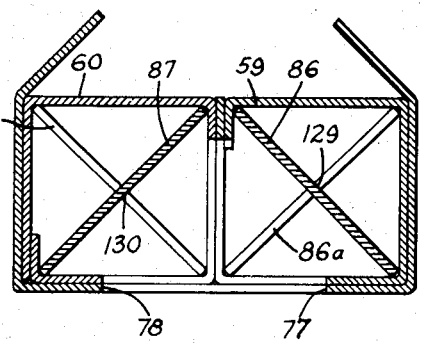
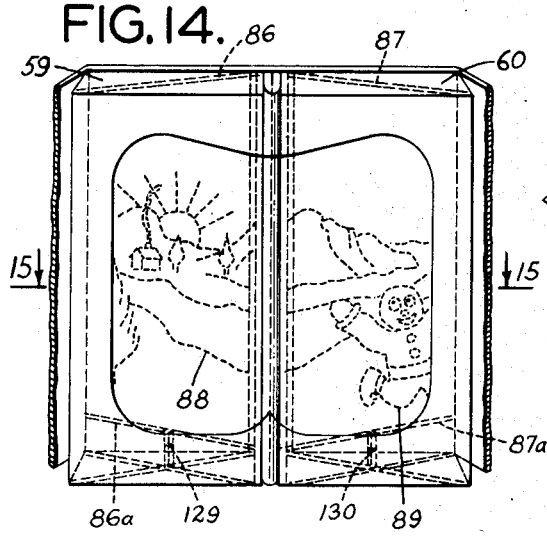
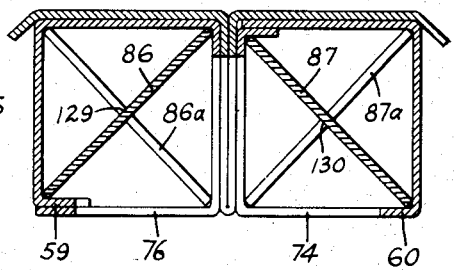
INVENTOR.
WILLIAM HOMER COLGATE
BY
Campbell, Brumbaugh & Free
HIS ATTORNEYS.

Aug. 11, 1953 W. H. COLGATE 2,648,156
DUAL CONTAINER WITH VIEWING WINDOW
Filed July 30, 1947 8 Sheets-Sheet 7

INVENTOR.
WILLIAM HOMER COLGATE
BY
Campbell, Brumbaugh, Free & Graves
ATTORNEYS

Aug. 11, 1953 W. H. COLGATE 2,648,156
DUAL CONTAINER WITH VIEWING WINDOW
Filed July 30, 1947 8 Sheets-Sheet 8

INVENTOR.
WILLIAM HOMER COLGATE
BY
Campbell, Brumbaugh & Free
HIS ATTORNEYS.

Patented Aug. 11, 1953

2,648,156

UNITED STATES PATENT OFFICE 2,648,156

DUAL CONTAINER WITH VIEWING WINDOW

William Homer Colgate, West Redding, Conn.

Application July 30, 1947, Serial No. 764,666

20 Claims. (Cl. 46—11)

The present invention relates to packages for articles. More particularly, it relates to new and improved container construction which may carry indicia on the several walls thereof that are adapted to cooperate in a highly entertaining and educational manner.

Broadly, the invention comprises at least two enclosures having walls and hinged together so as to be swingable about an axis. The several walls of the enclosures may carry indicia portions and the indicia portions on one enclosure are adapted to cooperate with associated indicia portions on the other enclosure to form more complete indicia when the enclosures are swung about their common axis to bring the several indicia portions into cooperating relationship. Preferably, the enclosures are containers in which articles of merchandise may be displayed although this is not necessary.

In a representative embodiment, substantially similar enclosures of suitable shape are employed which are secured together so as to be swingable about a common axis to bring adjacent indicia bearing sides thereon into cooperating relationship. The enclosures may be secured to a supporting member which may have indicia bearing flaps adapted to cooperate with the indicia bearing walls of the enclosures to form more complete indicia. In this fashion, a plurality of more complete indicia may be selectively formed which may tell a story in pictures, for example.

According to another embodiment, window portions may be formed in the enclosures, which are adapted to cooperate to form a single viewing window or proscenium arch construction when the enclosures are swung into viewing position. In this form, cooperating indicia bearing members inside the enclosures may cooperate to form complete indicia when the enclosures are swung to form the viewing window. Other window portions may be formed in the enclosures which cooperate to form a second viewing window through which articles of merchandise or other complete indicia formed by cooperating indicia portions inside the enclosures may be viewed. Inserts may be provided for the enclosures to enable the indicia portions to be changed as desired.

The invention also contemplates the provision of means for retaining the enclosures together to form an integral package as may be required for shipment and distribution.

The invention may be better understood from the following detailed description of several typical embodiments, taken in conjunction with the accompanying drawings, in which:

Figure 1 is a front view of a support for enclosures constructed according to the invention;

Figure 2 illustrates a representative blank that may be used for one of the enclosures;

Figure 3 illustrates another representative blank for a second enclosure;

Figure 4 is a view in perspective illustrating an assembled package constructed according to the invention;

Figure 5 is a view in transverse section of the package shown in Figure 4, taken along the line 5—5 of Fig. 4, looking in the direction of the arrows.

Figure 6 is a rear view of representative retaining means for holding several enclosures in assembled relationship, in accordance with the invention;

Figure 9 is a front view in perspective of a modified package constructed according to the invention which comprises the enclosure blanks shown in Figures 7 and 8 assembled to the retaining means of Figure 6;

Figure 10 is a view in transverse section taken along line 10—10 of Figure 9, looking in the direction of the arrows;

Figure 11 illustrates an insert which is adapted to be used with the form of the invention illustrated in Figures 9 and 10;

Figure 12 is a rear view of the assembled package comprising the blanks shown in Figures 7 and 8 and the retaining means of Figure 6;

Figure 13 is a view in transverse section taken along line 13—13 of Figure 12, looking in the direction of the arrows;

Figure 14 is a front view of the assembled package shown in Figure 12 with the two enclosures swung through 90°;

Figure 15 is a view in transverse section taken along line 15—15 of Figure 14, looking in the direction of the arrows;

Figure 16 illustrates a representative blank providing a unitary package construction according to the present invention;

Figure 7:
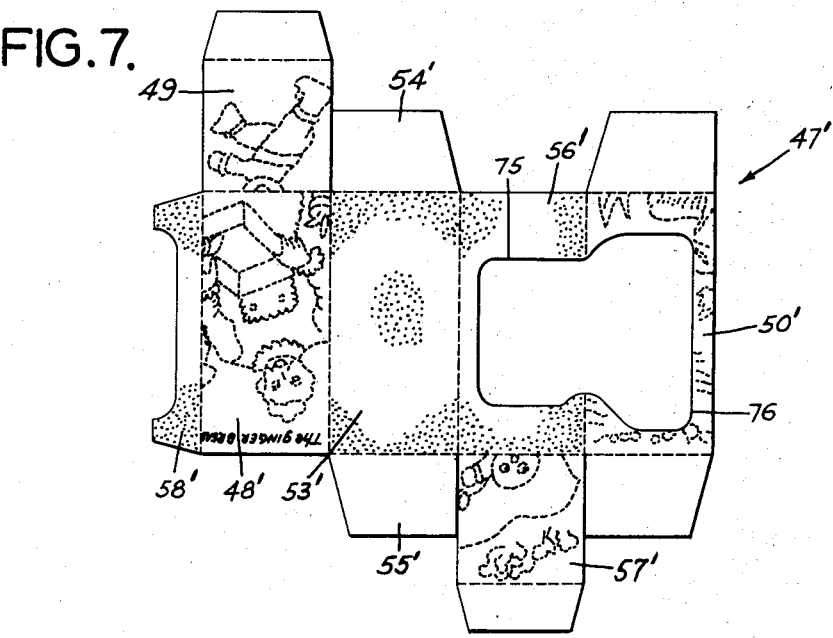
Figures 7 and 8 illustrate representative blanks that may be used for modified enclosures constructed according to the invention.

In the representative embodiment illustrated in Figs. 1–5, inclusive, the novel package of the invention comprises, for example, a pair of similar enclosures secured to a retaining member in such fashion that they can each be swung through 90° about a common axis. As shown in Fig. 1, the retaining means may comprise, for example, a substantially rectangular member 30 made of any suitable sufficiently rigid material such as cardboard, paper, plastic, impregnated fabric, or the like, scored parallel to the narrow edge thereof to form two outer flaps 31 and 32 and two adjacent support portions 33 and 34 to which a pair of enclosures are adapted to be secured as described in greater detail hereinafter.

In Fig. 3 is shown a blank 35 for one enclosure member which is suitably scored to provide the side portions 36, 38, 41, and 43, the flaps 39 and 40 at opposite ends of the side portion 38, the flaps 44 and 45 at opposite ends of the side portion 43, the opposite end closure members 37 and 42 on the side portions 36 and 41, respectively, and a securing flap 46 by means of which the side portion 36 may be attached to the side portion 43 to form an enclosure.

Fig. 2 illustrates a blank 47 of another enclosure member which is appropriately scored to provide the side portions 48, 50, 53 and 56, the flaps 54 and 55 secured at opposite ends of the side portion 53, the flaps 51 and 52, secured at opposite ends of the side portion 50, the opposite end closure members 49 and 57, and a securing flap 58, by means of which the side portion 48 may be secured to the side portion 50.

To assemble the novel package of the invention, the blank 35 is folded at the scored lines and the flap 46 is secured under the edge of the side portion 43 in any suitable manner as by gluing, stitching or stapling, for example, to form an enclosure of substantially rectangular cross-section. The opposite end flaps 39, 40 and 44, 45 are folded inwardly and the opposite end closure members 37 and 42, respectively, are folded down over them to form the finished enclosure. The blank 47 is folded and assembled in a similar manner and the two enclosure members 59 and 60, respectively, (Fig. 4) are secured to the support portions 33 and 34 of the retaining means 30 (Fig. 1), preferably in inverted relation to one another. This may be accomplished in any suitable manner as by gluing, stitching, or stapling, for example, the support portions 34 and 33 of the retaining means to two side portions as the side portions 36 and 56 of the blanks 35 and 47, respectively, for example.

As shown in Fig. 1, the outer flaps 31 and 32 of the retaining means 30 may carry indicia portions 61 and 62. Similarly, the side portions 50, 53 and 48 are the opposite end closure members 49 and 57 of the blank 47 in Fig. 2 may also carry indicia portions 63, 64, 65, 66 and 67, respectively. Also, the side portions 38, 41, 43 and the opposite end closure members 37 and 42 of the blank 35 (Fig. 3) may carry indicia portions 68, 69, 70, 71 and 72, as shown. These indicia portions are preferably so selected that when the package is in the assembled position as shown in Fig. 4, the indicia portions of any two adjacent faces of the retaining means 30, or of the enclosures 59 and 60, will cooperate to form a more complete indicia. Thus, in Fig. 4, the indicia 67 on the end closure member 57 and the indicia portion 71 on the end closure member 37 may cooperate to form the picture of a rabbit, for example. Obviously, no indicia portions are needed for the securing side portions 36 and 56, thus effecting a saving in the cost of manufacture.

It will be noted that by swinging the enclosures 59 and 60 each rearwardly through 90° to bring the support portions 33 and 34 of the retaining means 30 into back to back relationship, the rear faces of the outer portions 31 and 32 of the retaining means 30 may be brought into abutting relationship. Accordingly, cooperating indicia can also be provided on these rear faces which will cooperate to form a more complete indicia when the assembled package is swung into this position.

If desired, the several indicia portions on adjacent sides of the completed article may each cooperate to form a complete picture and the entire set of pictures may serve to tell a story which may be any of the well known children's stories, for example. Alternatively, each indicia portion may comprise only part of a relatively large picture such as a panorama, or cyclorama, for example. In such case, the indicia portions on adjacent sides of the article may cooperate to form only a portion of the entire picture. Other uses for the novel package assembly according to the invention will be readily apparent to those skilled in the art.

If desired, the enclosures 59 and 60 may be provided with cooperating viewing apertures through which cooperating indicia located within the enclosure members may be viewed, as shown in the embodiment illustrated in Figs. 6–15, inclusive. This form of the invention also includes means for locking a pair of enclosure members 59' and 60' in the assembled position as required for shipment or distribution, for example.

Figure 8:
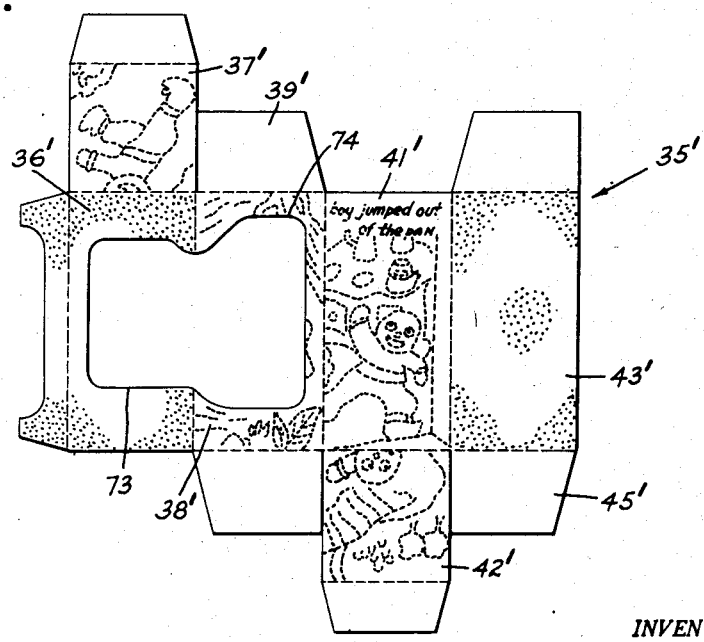

Referring now to Fig. 8, the enclosure member blank 35' is substantially like the blank shown in Fig. 3 and like parts are designated by like primed reference characters. It differs in that two adjoining side portions 36' and 38', for example, are provided with adjoining apertures 73 and 74, respectively. The blank 47' in Fig. 7 is like the corresponding blank in Fig. 2 and like parts are designated by like primed reference characters. It differs in that two adjoining side portions 56' and 50', for example, are provided with adjoining apertures 75 and 76, respectively.

The retaining means 30' (Fig. 6) is also like the retaining means 30 in Fig. 1 and like primed reference characters are used to designate like parts. It may also have cooperating aperture portions 77 and 78 formed in the support portions 33' and 34', as shown. Also, the outer flap 32' may have secured thereto a front portion 79 terminating in a securing tab 80. The flap 31', similarly, may have secured thereto a front portion 81 terminating in a tab 82, and a slot 83 which is adapted to receive the locking tab 80.

The enclosures 59' and 60' are assembled as before, with two side portions as the side portions 56' and 36', for example, of the blanks 47' and 35', respectively, secured to the support portions 33' and 34', respectively, of the retaining means 30' (Figs. 9 and 10). Preferably, one of the enclosures is mounted in inverted relation to the other, as shown. The apertures 75 and 73 in the enclosures 59' and 60', respectively, may be so shaped and positioned as substantially to register with the apertures 77 and 78, respectively, in the support portions 33' and 34', respectively.

If desired, the side wall 43' of the blank 35' may be secured in any suitable manner as by a suitable adhesive, for example, to the front face of the outer flap 32' of the retaining means 30' and the side portion 53' of the blank 47' may be secured in a similar manner to the front face of the outer flap 31' of the retaining means 30'.

With the enclosures 59' and 60' thus assembled and secured to the retaining means 30' of Fig. 6, the front portions 79 and 81 of the retaining means 30' are folded over the front faces 41' and 48', respectively, of the blanks 35' and 47', respectively, with the locking tab 82 between the enclosures 59' and 60'. The locking tab 80 is bent inwardly and passed through the slot 83 to a position between the side walls 50' and 38' of the enclosures 59' and 60', respectively, as shown in greater detail in Figs. 9 and 10.

If desired, the inner faces of the walls of the enclosures 59' and 60' may carry suitable indicia portions adapted to cooperate to form more complete indicia that can be viewed through the apertures 73, 75, 77 and 78 (Fig. 10), or through the apertures 74 and 76 when the assembly is in the Fig. 15 position or both. Also, indicia bearing inserts may be disposed within either of the enclosures 59' and 60' to add additional interest, if desired. For example, an insert 84 cut out in the shape of a duck as shown in Fig. 11 and provided with a slot 85 may be retained in viewing position in any suitable manner as by the adjacent walls of the enclosures 59' and 60', which define the apertures 74 and 76, as shown in greater detail in Fig. 10.

Obviously, indicia may be provided on inserts adapted to be placed within either of the enclosures 59' or 60' parallel to the walls thereof, such indicia being designed to cooperate to form more complete indicia when the enclosures 59' and 60' are swung into operative relationship. Also, such inserts may be disposed diagonally within the enclosures 59' and 60', as shown in greater detail in Figs. 12-15, inclusive.

Thus, diagonal inserts 86 and 87 may be inserted within the enclosures 59' and 60', as shown in Fig. 13. As shown in greater detail in Fig. 12, the diagonal inserts 86 and 87 may carry indicia portions 88 and 89, respectively, which are adapted to be viewed through the adjoining apertures 77 and 78 in the retaining means 30'. When the enclosures 59' and 60' are swung rearwardly through 90° to the position shown in Fig. 15 and the diagonals 86 and 87 are viewed through the cooperating apertures 74 and 76, the indicia 88 and 89 appear reversed as better shown in Fig. 14.

Where the diagonal inserts 86 and 87 are made of relatively non-rigid material such as light paper, for example, additional support may be afforded by other diagonal supports 86a and 87a located at right angles to the inserts 86 and 87 (Fig. 13). The diagonal supports 86a and 87a may be provided with vertical slots 129 and 130, respectively, (Fig. 12) within which the diagonal inserts 86 and 87 are adapted to be received. Preferably, the supports should not extend up to the lower edges of the apertures 77 and 78 so as not to obscure the indicia to be viewed. The supports 86a and 87a may also provide support for inserts like the duck 84 shown in Figs. 10 and 11.

Figure 12A:
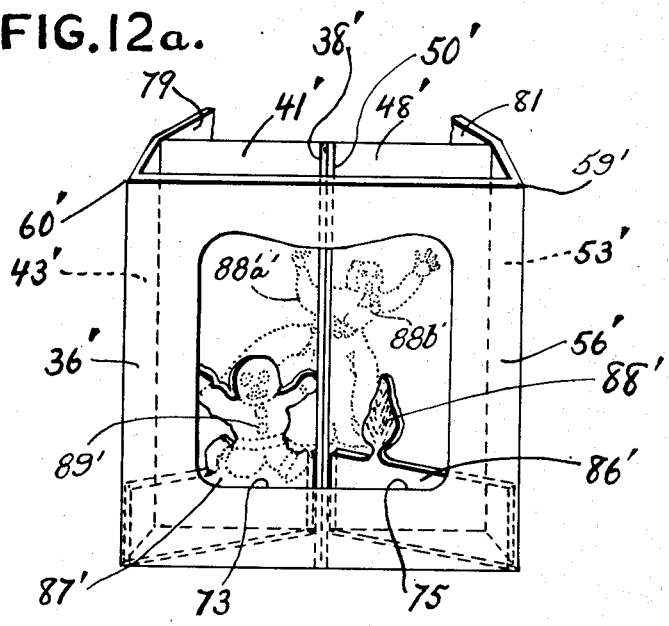
Figure 12a is a modification of Figure 12 in which inserts carrying indicia representing a foreground are adapted to be viewed against background indicia carried by the sides of the enclosures.
Figure 14A:
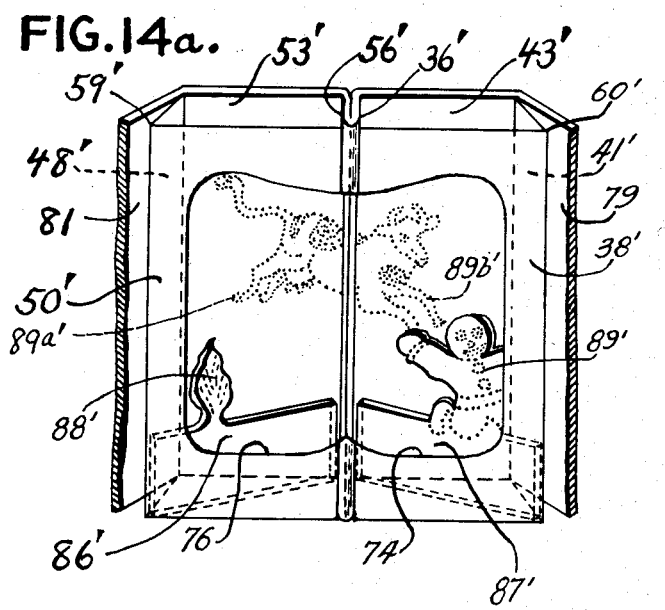
Figure 14a is a front view of the assembled package shown in Figure 12a with the two enclosures swung through 90°.

As shown in Figures 12a and 14a, diagonal inserts 86' and 87' may, if desired, carry indicia 88' and 89' representing a foreground to be viewed against a background which may include indicia 88a' and 88b' (Fig. 12a) and 89a' and 89b' (Fig. 14a) carried by the sides of the enclosures 59' and 60'. In such case, the inserts 86a' and 87a' should be smaller than the sides of the enclosures 59' and 60' so that the indicia 88a', 88b' and 89a', 89b' carried by the walls of the latter will be visible. By providing different indicia i. e. indicia 88a' and 88b' and indicia 89a' and 89b' on the inside walls of the enclosures 59' and 60', it will be apparent that the foregrounds represented by the diagonal inserts 86a' and 87a' can be viewed against two different backgrounds corresponding to the Fig. 13 and Fig. 15 positions of the device, respectively.

Figure 17:
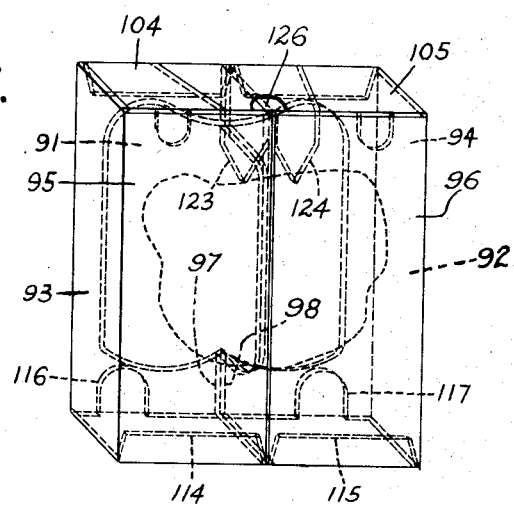
Figure 17 is a front view in perspective illustrating an assembled package made from the blank shown in Figure 16.
Figure 18:
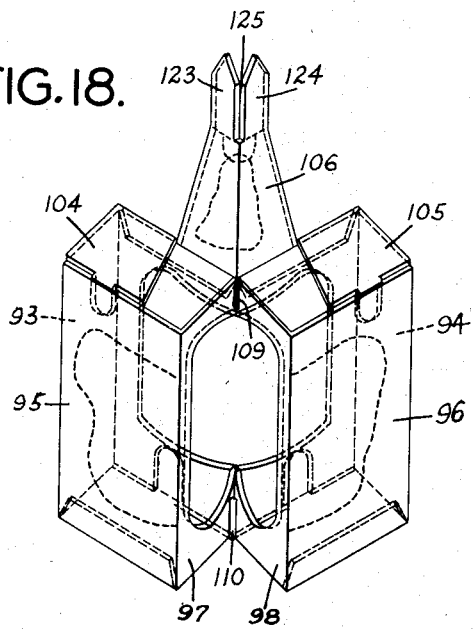
Figure 18 is another front view in perspective showing the assembled package of Figure 17 with the two enclosures rotated through an angle and the locking tabs in unlocked position.

Instead of securing enclosures 59' and 60' to a separate retaining means 30', the entire package assembly may be formed from a single blank, as shown in Figs. 16-18, inclusive. In this embodiment, a blank 90 is used which may be substantially rectangular in shape and may be scored substantially parallel to the narrow edge thereof, for example to form left and right rear enclosure walls 91 and 92, respectively, left and right side walls 93 and 94, respectively, front walls 95 and 96, left and right inside walls 97 and 98, respectively, and a securing tab 99 adapted to be attached in any suitable manner as by adhesive, stitching or lock tabs, for example, beneath the front wall 96.

The left front wall 95 may, as desirable, be provided with top and bottom flaps 100 and 101 and the right front wall 96 may be similarly provided with top and bottom flaps 102 and 103.

The left and right rear walls 91 and 92, respectively, may, as desirable, be provided with upper closure members 104 and 105 and a central locking tab 106 which also cooperates to form part of a closure for the two enclosure members. Bottom closure members 107 and 108 may also be provided for the left and right rear walls 91 and 92.

To assemble, the securing tab 99 is attached over or under the front wall 96 in any suitable manner as by gluing, stitching or stapling, for example, and the blank is folded along the score lines as shown. With the left and right inside walls 97 and 98 lying directly over the rear walls 91 and 92, staples, stitching or other suitable securing means 109 and 110 are inserted at the upper and lower portions of the score line 111 as indicated in Fig. 18, thus forming hinges. The upper flaps 100 and 102 are folded inwardly and tabs 112 and 113, respectively, are bent downwardly within the enclosures. The lower closure members 107 and 108 are folded inwardly and the tabs 114 and 115, respectively, are bent upwardly into the enclosures. The lower flaps 101 and 103 are then bent inwardly and the tabs 116 and 117, respectively, thereon are inserted within the slots 118 and 119 formed in the lower closure members 107 and 108, respectively. The top closure members 104 and 105 are bent downwardly and the tabs 120 and 121 thereon are inserted within the slots 121 and 122, respectively formed in the upper flaps 100 and 102, respectively.

The locking member 106 is provided with two adjacent tabs 123 and 124 having a slot 125 therebetween and having a score line which is an extension of the score line between the left and right rear walls 91 and 92. It is also provided with a semi-circular cutout portion 126 which is adapted to be bent upwardly to form a removal tab, as shown in greater detail in Fig. 17. The locking member 106 is folded downwardly over the upper flaps 100 and 102 and the tabs 123 and 124 are inserted within corresponding slots 127 and 128 formed in the upper flaps 100 and 102, as shown.

The assembled package is shown in perspective in Fig. 17. It can be readily disassembled merely by grasping the removal tab 126 and pulling out the locking tab 106. After this has been done, it will be found that if the two enclosures are swung apart to the position indicated in Fig. 18, the locking tab 106 will spring upwardly, as shown in the figure. This embodiment of the invention can also be provided with cooperating indicia portions on the inside and outside walls of the several enclosure members, as described above. If desired, the tabs 123 and 124 on the locking member 106 may be omitted, in which case, the latter will retain the two enclosures together when folded over their ends as in Fig. 17.

It will be apparent from the foregoing description that the invention provides a novel and highly entertaining and instructive package assembly which may be used initially as a container for the shipment, distribution and display of goods and subsequently as a toy for children. Alternatively, it may be used either as a container alone or as a toy alone, as desired.

It will be further understood that the several embodiments described in detail are susceptible of considerable modification within the scope of the invention. While the foregoing description indicates that cooperating indicia portions may be formed on adjacent walls of the article, obviously the adjacent indicia need have no relation to one another but may be entirely different, if desired. Also, the indicia may be entirely eliminated if the article is to serve solely as a container. In certain applications, as where the device serves only as a top or as a greeting card device, for example, the opposite end closure members may be eliminated, as desired, so that the enclosures may have side walls only.

In packaging loose goods such as cereals, soap powder and the like in the novel package assembly of the invention, obviously, it is not feasible to provide the viewing apertures in the enclosures 59 and 60 while the latter are serving as containers. In such case, the apertures may be defined on the enclosures in any suitable manner as by printing or incomplete perforation, for example. After the contents have been removed, the outlined portions may be cut or pushed out to form the viewing apertures. The material thus removed may be appropriately scored and may carry suitable indicia so as to enable one or more inserts to be cut out therefrom for insertion within the enclosures. Alternatively, the enclosures may be made of plastic which is transparent in the adjoining portions where the viewing window is to be located, and is substantially opaque elsewhere.

Obviously, the viewing apertures in the several embodiments illustrated may be covered by any suitable transparent material such as cellophane, for example, which may be secured either to the inside or to the outside walls of the article, as desired, or the assembled package may be provided with a cellophane binder or wrapper. Also, in the embodiment illustrated in Fig. 13, for example, additional viewing apertures may be provided in the enclosure so that the rear faces of the diagonal members 86 and 87 may be viewed or so that articles may be disposed on either or both sides of either or both diagonal members 86 and 87 where they will be readily available for inspection.

Where a retaining means 30 is used, as in Figs. 1 and 6, for example, the portions 33 and 34 may be provided with flaps at the upper and lower ends thereof by means of which they may be secured to the enclosures 59 and 60. Thus, the portions 33 and 34 might be provided with separate upwardly extending flaps appropriately scored and adapted to be folded downwardly over the end closure members 57 and 37, respectively, and terminating in tabs adapted to be inserted between corresponding tabs on the closure members 57 and 37 and the upper inside faces of the side walls 48 and 41, respectively. Similar downwardly extending flaps might be provided on the portions 33 and 34, properly scored and adapted to be folded upwardly over the lower inside faces of the side walls 56 and 36, resepectively, and between the latter and the tabs formed on the end closure members 42 and 49, respectively. The locking tab construction 106 of the Fig. 16 embodiment might also be employed in this modification to hold the two enclosures in assembled relationship.

Figure 19:
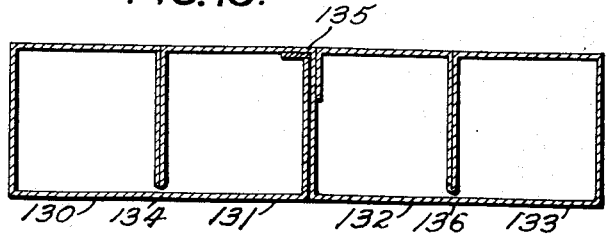
Fig. 19 is a top view in horizontal section of a packaging assembly constructed in accordance with the present invention.

While only two enclosures have been shown in the several embodiments described above, obviously, the novel package assembly of the invention can be made with more than two enclosures as illustrated by Fig. 19. For example, four similar enclosures 130, 131, 132 and 133 might be assembled in a string with, adjacent pairs being mounted for swinging movement about a common axis to afford a series of substantially parallel axes 134, 135 and 136, these axes lying alternately at front and rear common edges of the adjacent enclosures when the latter are disposed in abutting relationship in a single line to form an assembly of substantially rectangular shape.

The several embodiments described above are intended to be merely illustrative of the invention. It will be readily apparent to those skilled in the art that the novel package assembly of the invention can be constructed in other forms than the several specific embodiments shown. Accordingly, the invention is not to be limited save as defined in the appended claims.

I claim:

1. In combination, a plurality of substantially rectangular enclosures adapted to be disposed side by side in abutting relationship in a single line of substantially rectangular shape and means mounting successive adjacent pairs of said enclosures for swinging movement about a common axis coinciding with a line in the surface of each of the respective adjacent enclosures, said common axes being disposed alternately at the front and rear common edges of the enclosures when the latter are disposed in said single line.

2. In combination, a pair of tubular enclosures, means mounting said enclosures for swinging movement about a common axis coinciding with a line in the surface of each of said enclosures, which line is parallel to each surface throughout the entire lengths of said enclosures, and means affording access to each of said tubular enclosures at an end thereof whereby the contents of the enclosures may be entered or withdrawn in directions parallel to the said common axis, and separable and reengageable latch means retaining said enclosures releasably against swinging movement.

3. In combination, a pair of similar tubular enclosures each having a plurality of sides, forming a plurality of corners, means mounting said enclosures for swinging movement about a common axis coinciding with a corner of each of said enclosures, and means forming indicia portions over sides of said enclosures that can be brought into adjacent relationship by swinging said enclosures about said axis, said indicia portions being adapted to form more complete indicia when in said adjacent relationship.

4. In combination, a pair of similar tubular enclosures each having a plurailty of sides forming a plurality of corners, means mounting said enclosures for swinging movement about a common axis coinciding with a corner of each of said enclosures, and window means in at least two sides of said enclosures having edges that can be brought into face-to-face abutting relationship by swinging said enclosures about said axis, said window means being so shaped and positioned as to cooperate in forming a viewing window through which the interiors of said enclosures may be viewed.

5. In combination, a pair of similar tubular enclosures each having a plurality of side walls forming a plurality of corners, means mounting said enclosures for swing movement about a common axis coinciding with a corner of each of said enclosures, means forming window means in at least two sides of said enclosures having edges that can be brought into face-to-face abutting relationship by swinging said enclosures about said axis, said window means being so shaped and positioned as to cooperate in forming a viewing window through which the interiors of said enclosures may be viewed when the edges of said two sides are in abutting relationship, and means forming cooperating indicia portions inside said enclosures that are adapted to form more complete indicia when said enclosures are swung to place the edges of said two sides in abutting relationship.

6. In combination, a pair of similar tubular enclosures each having a plurality of side walls forming a plurality of corners, means mounting said enclosures for swinging movement about a common axis coinciding with a corner of each of said enclosures, means forming window means in at least two sides of said enclosures having edges that can be brought into face-to-face abutting relationship by swinging said enclosures about said axis, said window means being so shaped and positioned as to cooperate in forming a viewing window through which the interiors of said enclosures may be viewed when the edges of said two sides are in abutting relationship, means forming cooperating indicia portions inside said enclosures that are adapted to form more complete indicia when said enclosures are swung to place the edges of said two sides in abutting relationship, and means forming indicia portions on sides of said enclosures having edges that can be brought into face-to-face abutting relationship by swinging said enclosures about said axis, said indicia portions being adapted to form more complete indicia portions when said last named edges are in abutting relationship.

7. In combination, a pair of enclosures of substantially rectangular cross-section, means mounting said enclosures for swinging movement about a common axis coinciding with a line in the surface of each of said enclosures, and flap means mounted for swinging movement about other edges of said enclosures lying parallel to said common axis, said flap means being of a shape and size to overlie at least partially sides of said enclosures adjacent said other edges.

8. In combination, a pair of similar enclosures of substantially rectangular cross-section and having sides forming a plurality of corners, a retaining member comprising an plurality of rectangular elements pivotally secured to one another, and means securing said enclosures respectively to two adjacent of said rectangular elements so as to be capable of swinging movement about a common axis lying between said two adjacent elements and coinciding with a corner of each of said enclosures.

9. In combination, a pair of similar enclosures of substantially rectangular cross-section and having sides forming a plurality of corners, a retaining member comprising at least four rectangular elements pivotally secured to one another, means securing said enclosures to the two innermost of said rectangular elements so as to be capable of swinging movement about a common axis lying between said two innermost elements and coinciding with a corner of each of said enclosures, and means forming indicia portions on the outermost two of said rectangular elements and on the sides of said enclosures, said indicia portions being adapted to cooperate to form more complete indicia when said enclosures are swung to bring the sides thereof into abutting relationship with each other or with said indicia bearing rectangular elements.

10. In combination, a pair of similar enclosures having sides, means mounting said enclosures for swinging movement about a common axis, flap means secured to one of said enclosures and extensible over the front side thereof, means forming a slot in said flap means in front of said common axis, second flap means secured to the other of said enclosures and extensible over the front of said other enclosure, tab means on said second flap means insertable in the slot in said first flap means and into the space between said enclosures and a withdrawal tab secured to said second flap means.

11. In combination, a pair of similar enclosures having sides, means mounting said enclosures for swinging movement about a common axis, means forming window means in at least two sides of said enclosures that can be brought into abutting relationship by swinging said enclosures about said axis, said window means being so shaped and positioned as to cooperate in forming a viewing window through which the interiors of said enclosures may be viewed, insert means disposed within at least one of said enclosures and viewable through said viewing window, said insert means bearing foreground indicia thereon, and means forming cooperating indicia portions inside said enclosures that are adapted to form background indicia for said insert means when said enclosures are swung to place said two abutting sides in abutting relationship.

12. In combination, a pair of similar enclosures having sides, means mounting said enclosures for swinging movement about a common axis, means forming window means in at least two sides of said enclosures having edges that can be brought into face-to-face abutting relationship by swinging said enclosures about said axis, said window means being so shaped and positioned as to cooperate in forming a viewing window through which the interiors of said enclosures may be viewed, and means forming second window means in two other sides of said enclosures having edges that can be brought into face-to-face abutting relationship by swinging said enclosures about said axis, said second window means being so shaped and positioned as to cooperate in forming a second viewing window through which the interiors of said enclosures may be viewed.

13. In combination, a pair of similar enclosures having side walls, means mounting said enclosures for swinging movement about a common axis, means forming window means in at least two sides of said enclosures that can be brought into abutting relationship by swinging said enclosures about said axis, said window means being so shaped and positioned as to cooperate in forming a first viewing window through which the interiors of said enclosures may be viewed when said two sides are in abutting relationship, means forming second window means in two other sides of said enclosures that can be brought into abutting relationship by swinging said enclosures about said axis, said second window means being so shaped and positioned as to cooperate in forming a second viewing window through which the interiors of said enclosures may be viewed, means forming cooperating indicia portions inside said enclosures that are adapted to form one or more complete indicia when swung to form said first viewing window, and means forming indicia portions on other sides of said enclosures that are adapted to form other more complete indicia when swung to form said second viewing window.

14. In combination, a pair of enclosure members having sides, means mounting said enclosures for swinging movement about a common axis, and a locking member secured on adjacent sides of said enclosure members and having portions adapted to lie over portions of the ends of said enclosure members when said adjacent sides lie substantially in a common plane, said locking member having tab means adapted to cooperate with adjacent sides of said enclosures for retaining said enclosures releasably against swinging movement.

15. In combination, a pair of tubular enclosure members having sides, means mounting said enclosures for swinging movement about a common axis coinciding with a line in the surface of each of said enclosure members, and a retainer member secured on adjacent sides of said enclosure members and having portions adapted to lie over portions of the ends of said enclosure members when said adjacent sides lie substantially in a common plane, for retaining said enclosures releasably against swinging movement.

16. The combination as set forth in claim 8, said means securing said enclosures comprising means forming slits at opposite ends of said enclosures and flap means on opposite ends of two adjacent of said rectangular elements, said flap means being inserted in said slits.

17. A blank for a container construction comprising an elongated sheet having parallel score lines spaced therealong dividing the sheet into at least eight substantially rectangular sections, means forming window means in a pair of adjacent sections which cooperate to form a single viewing window, and tab means for securing the eighth section to the first section of said sheet to form a container in which the said pair of sections having said viewing window are adapted to be joined to the pair of opposite sections along the two score lines which divide the respective pairs of sections to form the blank into two enclosures adapted to be swung about a common axis which will coincide with a line in the surface of each enclosure.

18. A blank for a container construction comprising an elongated sheet having parallel score lines spaced therealong dividing the sheet into at least eight substantially rectangular sections, laterally extending flap means formed at at least one end of the first and sixth sections; means forming window means in a pair of adjacent sections which cooperate to form a single viewing window, means forming window means in the seventh and eighth sections which cooperate to form a second viewing window, and tab means for securing the eighth section to the first section of said sheet to form a container in which the said pair of sections having said viewing window are adapted to be joined to the pair of opposite sections along the two score lines which divide the respective pairs of sections to form the blank into two enclosures adapted to be swung about a common axis which will coincide with a line in the surface of each enclosure.

19. In combination, a pair of enclosures, means mounting said enclosures for swinging movement about a common axis coinciding with a line in the surface of each enclosure, window means in at least one side of one of said enclosures, means in said one enclosure carrying indicia viewable through said window means, flap means hingedly secured to a side of said one enclosure and adjacent the window means therein, and indicia means carried by said flap means and adapted to be viewed in relation to said indicia viewable through said window.

20. The combination as set forth in claim 11, said insert means being formed from at least a portion of the material removed from said sides of said enclosures to form said viewing window.

WILLIAM HOMER COLGATE.

References Cited in the file of this patent

UNITED STATES PATENTS

| Number | Name | Date |
|---|---|---|
| 247,302 | Candy | Sept. 20, 1881 |
| 903,078 | Gianini | Nov. 3, 1908 |
| 903,824 | Stavisky | Nov. 10, 1908 |
| 1,974,552 | Wallbank | Sept. 25, 1934 |
| 1,991,649 | Barber | Feb. 19, 1935 |
| 2,112,062 | Berger | Mar. 22, 1938 |
| 2,287,729 | Fallert | June 23, 1942 |
| 2,396,010 | Isenberg | Mar. 5, 1946 |